Dec. 18, 1928. 1,695,905
T. A. TRUE
SEED POTATO CUTTER
Filed April 11, 1928 5 Sheets-Sheet 1

Inventor
Thomas A. True
By Clarence A. O'Brien
Attorney

Dec. 18, 1928.

T. A. TRUE

SEED POTATO CUTTER

Filed April 11, 1928 5 Sheets-Sheet 3

1,695,905

Inventor

Thomas A. True

By Clarence A. O'Brien,
Attorney

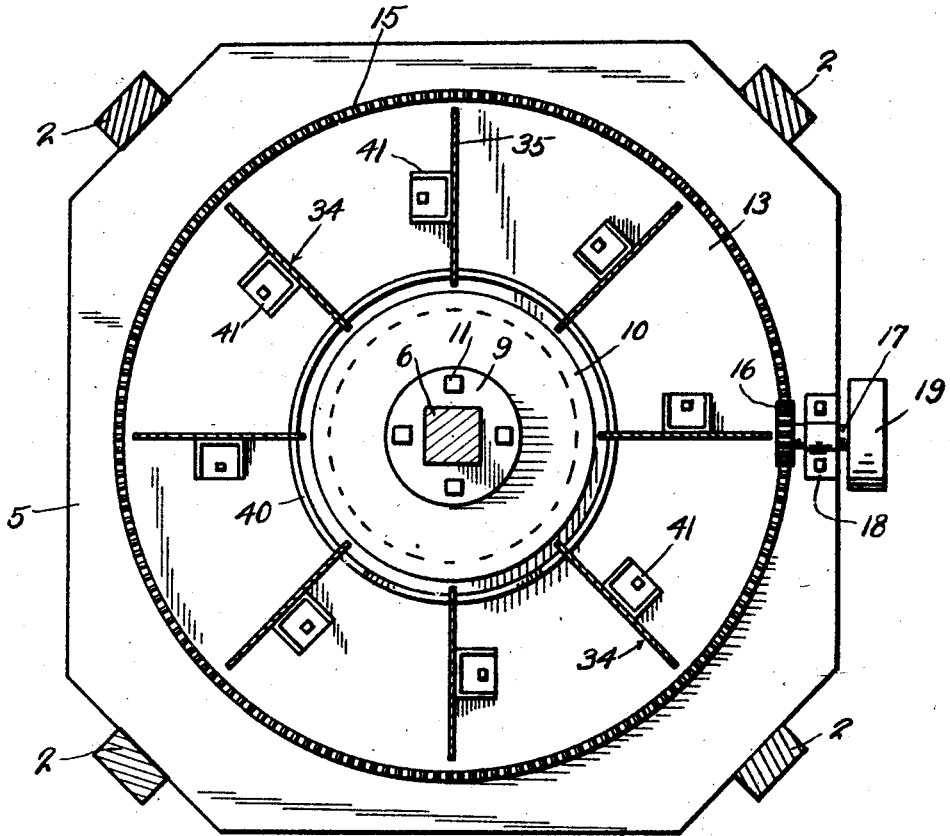
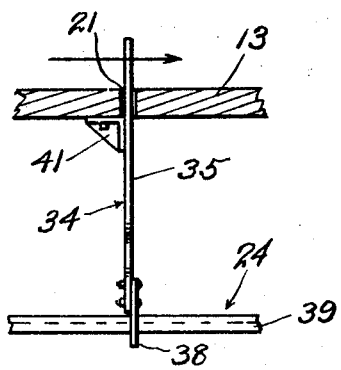

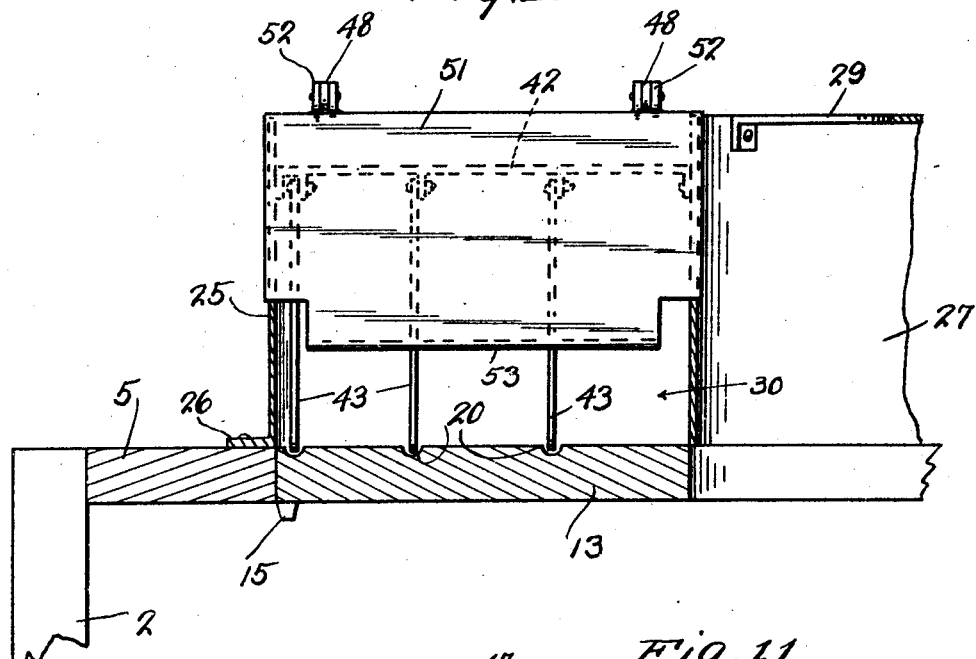
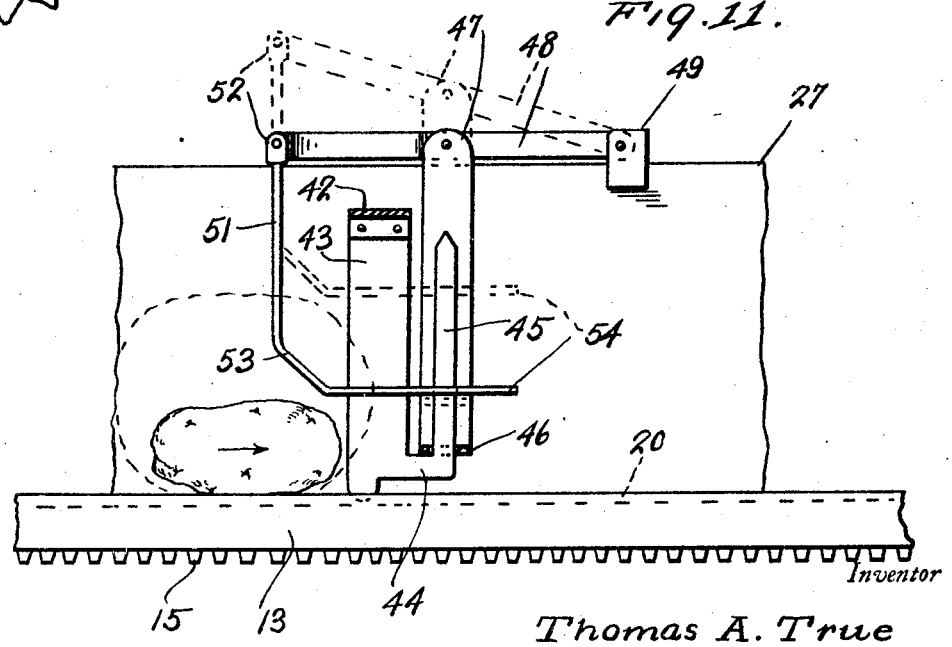

Patented Dec. 18, 1928.

1,695,905

UNITED STATES PATENT OFFICE.

THOMAS A. TRUE, OF DECLO, IDAHO.

SEED-POTATO CUTTER.

Application filed April 11, 1928. Serial No. 269,038.

The present invention relates to improvements in vegetable cutters and has reference more particularly to a machine for the purpose of cutting seed potatoes into relatively small sections to facilitate rapid and easy planting of the same.

One of the important objects of the present invention is to provide a seed potato cutter which will cut a potato longitudinally and also transversely into relatively small sections. A series of spaced vertically disposed knives are arranged in a stationary manner to cut the potato in one direction, a horizontally disposed knife being arranged for vertical movement adjacent the vertical knives so that a potato may be cut horizontally as well as vertically and by arranging the horizontal knife for vertical movement, potatoes of different sizes can be properly cut up into small sections. A further object of the invention is to provide a seed potato cutter which includes a potato engaging member that is arranged forwardly of the knives and which is furthermore operatively associated with the vertically movable horizontal cutter to properly position the same depending upon the size of the potato that is being cut up into small sections. A still further object of the invention is to provide a seed potato cutter that includes a plurality of spaced pusher members that force the potatoes one at a time into engagement with the cutting mechanism, said pusher members being capable of vertical slidable movement through the platform on which the potatoes are supported so that said pusher members will move downwardly after passing beneath the cutting mechanism.

A further object is to provide a seed potato cutter of the above mentioned character which is simple in construction, inexpensive, strong and durable and further well adapted to the purposes for which it is designed.

Other objects and advantages will become apparent during the course of the following description.

In the accompanying drawings, forming a part of this specification, and in which like numerals indicate like parts throughout the same:—

Figure 1:
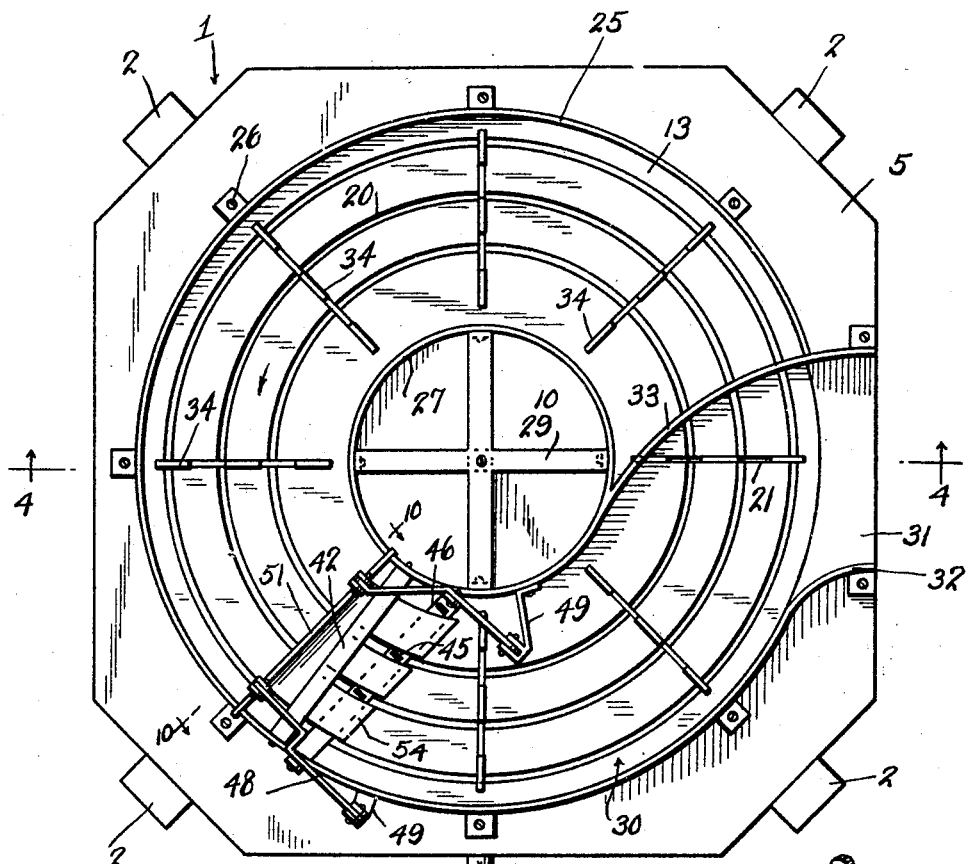
Figure 1 is a top plan view of a seed potato cutter embodying my invention.
Figures 2, 3:
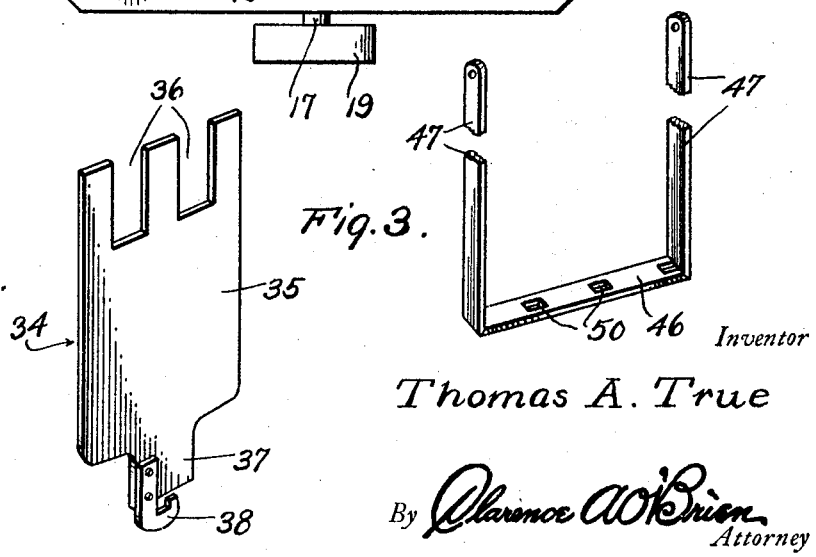
Figure 2 is a detail perspective view of one of the pusher members.
Figure 4:
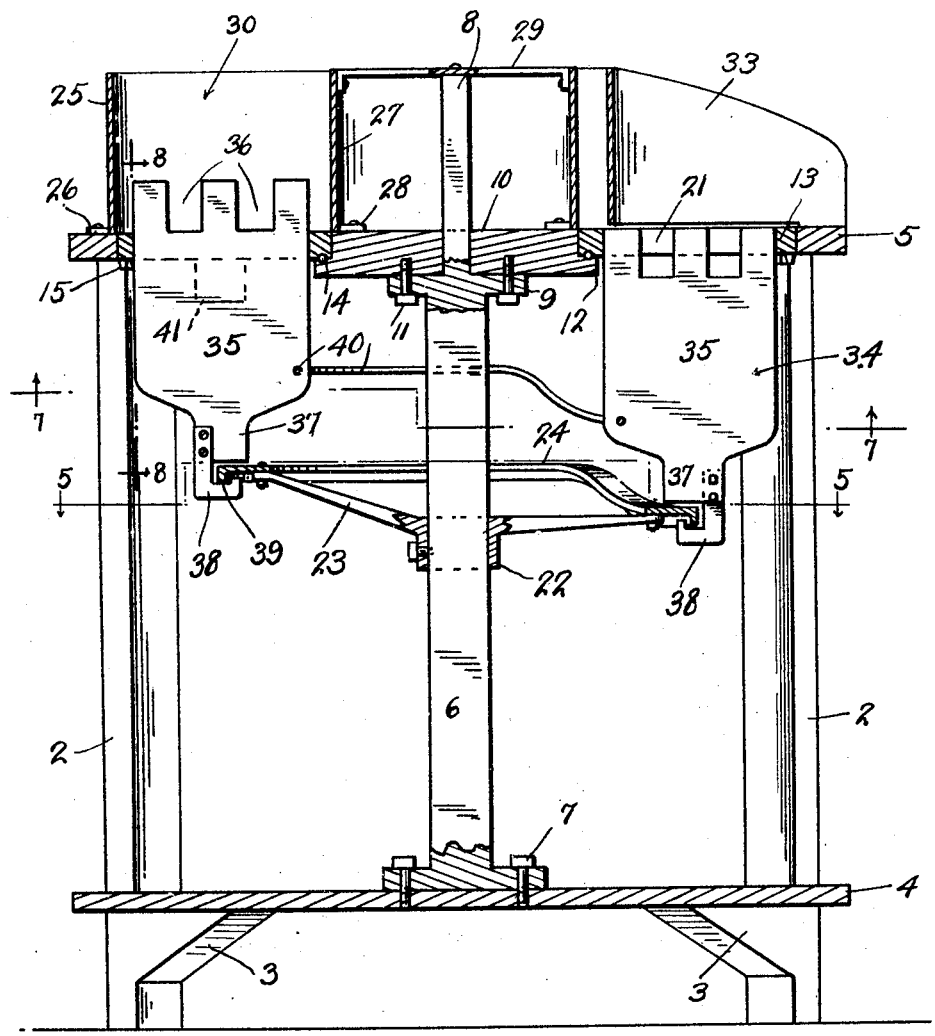
Figure 5:
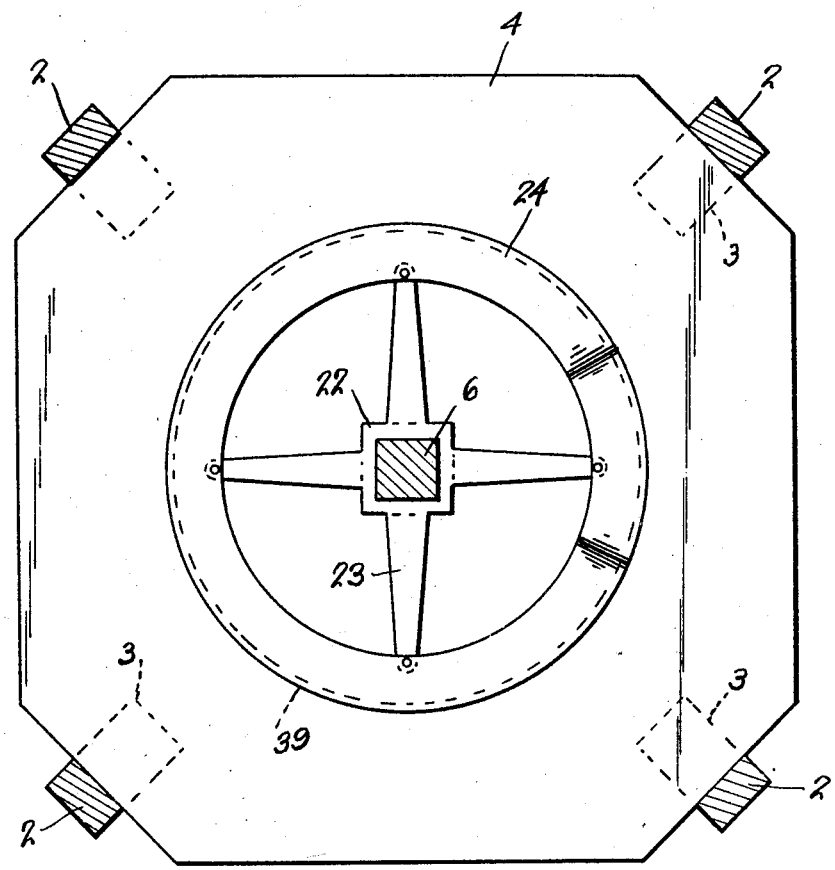
Figure 6:
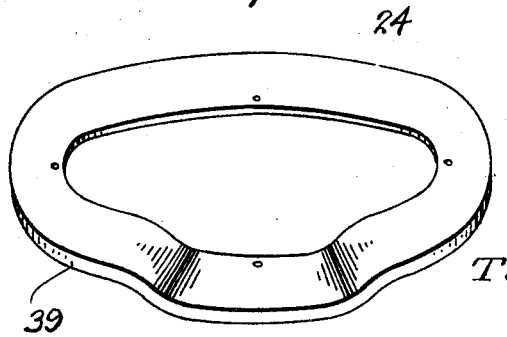

Figure 3 is a detail fragmentary perspective view of the horizontal cutting knife and the supporting bars therefor, Figure 4 is a vertical sectional view taken approximately on the line 4—4 of Figure 1, looking in the direction of the arrows, Figure 5 is a transverse section taken approximately on the line 5—5 of Figure 4 looking in the direction of the arrows, the lower portions of the pressure members not being shown, Figure 6 is a detail perspective view of the cam track forming a salient part of the present invention, Figure 7 is a sectional view taken approximately on the line 7—7 of Figure 4 looking upwardly, Figure 8 is a vertical section taken on the line 8—8 of Figure 4 looking in the direction of the arrows, Figure 9 is a detail perspective view of the potato engaging plate showing the slit formed in the horizontal portion of the plate for accommodating the vertical knives, Figure 10 is a sectional view taken approximately on the line 10—10 of Figure 1, and Figure 11 is a view partly in elevation and partly in section of the cutting mechanism and the potato engaging plate member associated with the horizontal cutting knife.

In the drawings wherein for the purpose of illustration is shown the preferred embodiment of my invention, the numeral 1 designates generally a stand, the same comprising the corner posts 2 each of which is formed with an inwardly extending shoulder or lug 3 for supporting the base 4 in the manner as clearly shown in the Figures 4 and 5 of the drawings. A relatively thick plate 5 is supported between the upper ends of the corner posts in any appropriate manner and this top 5 is formed with an enlarged central opening for a purpose to be presently described.

A center post or standard 6 is secured at its lower end on the base 4 by any suitable fastening means as shown at 7 and as is more clearly shown in Figure 5 of the drawings, this post or standard is rectangular in cross section.

The upper reduced end 8 of this post or standard 6 projects upwardly through the central opening formed in the top 5 and an annular flange 9 is formed on this post at its juncture with the reduced upper end 8 as clearly illustrated in Figure 4. A circular disk 10 surrounds the reduced upper end 8 of the post or standard 6 and is rigidly attached to the flange 9 by the securing means shown at 11. An annular flange 12 is formed on the periphery of this circular disk 10 at the bottom thereof for supporting the inner peripheral edge portion of the ring-like platform 13 that is disposed within the enlarged opening formed in the top 5 and the outer diameter of this ring-like platform is slightly less than the diameter of the opening formed in the top 5. Suitable ball bearings such as are shown at 14 in Figure 4 are arranged between the bottom face of the inner edge portion of the ring-like platform 13 and the adjacent face of the flange 12 to permit the easy rotation of the platform. Gear teeth 15 are formed on the bottom face of the ring-like platform 13 adjacent the outer peripheral edge thereof and meshing with the gear teeth 15 is the spur gear 16 secured on the inner end of a shaft 17 that is secured to the underside of the top 5 in a suitable bearing 18, a pulley 19 being secured on the outer end of this shaft 17 for connection with any suitable driving means.

The intermeshing gears provide the means whereby the platform 13 may be rotated. While I have shown the platform as being rotated through the medium of intermeshing gears, it is to be understood that the platform may be frictionally driven but I do not wish to limit myself to the particular manner in which said platform is adapted to be rotated. As clearly shown in Figures 1 and 10 of the drawings, the upper face of the ring-like platform 13 is formed with the concentrically arranged annular grooves 20 and the purpose thereof will be hereinafter more fully explained. Furthermore, the platform 13 is formed with a series of spaced radial slots 21 that extend completely through the ring-like platform. A spider including a rectangular hub 22 and the radial arms 23 is secured on the intermediate portion of the center post or standard 6 and supported by the outer ends of the radial arms 23 of this spider is a cam shaped track 24. The specific construction of the cam track is shown very clearly in Figure 6 of the drawings. A circular vertical wall 25 extends around the opening formed in the top 5 and the lower edge of this wall is formed with the attaching ears 26 that extend outwardly and are secured to the upper face of the top 5 as clearly shown in the drawings.

An inner circular wall 27 is arranged above the stationary disk 10 and the lower edge of the inner wall is formed with inwardly extending attaching ears 28 that are secured to the upper face of the disk 10 as shown in Figure 4. Intersecting cross bars 29 are secured at their points of intersection on the upper end of a reduced portion 8 of the center post 6, the cross bars being secured at their outer ends to the inner face of the upper edge portion of the inner circular wall 27 as also shown in Figure 4. The inner and outer circular walls provide a hopper designated by the numeral 30 for disposition over the rotatable ring-like platform 13 and this hopper is provided with a discharge chute shown at 31 in Figure 1 and this chute is formed by leaving a portion of the outer circular wall 25 open and having one end of the outer circular wall disposed outwardly as at 32. An additional vertical wall 33 extends tangentially from the inner circular wall 27 across the form at the top of the stand. Also forming a salient part of the present invention are the potato pressure members shown at 34. Each of these pressure members includes a rectangular-shaped plate 35 that is adapted for vertical slidable movement through the respective radial slots 21 formed in the rotatable ring-like platform 13.

The upper edge of the plate 35 is formed with the cutout portions 36 to accommodate the vertical cutting knives, the construction of which will be presently described. The lower edge of the plate 35 of each pressure member is formed with the reduced neck portion 37 and carried by this neck portion is the hook-shaped member 38 that cooperates with the depending annular flange 39 formed at the outer edge of the circular or cam-shaped track 24 in the manner as clearly shown in Figure 4 of the drawings. A wire ring 40 extends through suitable openings provided in the several vertically movable pressure members and by providing this wire ring, said pressure members may be successively raised and lowered by reason of the cooperation between the hoop-shaped members 38 and the cam track 24. For the purpose of steadying the vertically reciprocable pressure members, there is secured on the underside of the rotatable ring-like platform adjacent each of the slots 21, a lug 41 engages with one face of a plate 35 of each pressure member as clearly illustrated in Figure 8 of the drawings. The cutting mechanism forming an important part of the present invention will now be specifically described. A bar 42 extends across the hopper 30 adjacent the discharge chute 31 and the ends of this bar are rigidly secured to the inner opposed faces of the walls of the hopper.

A series of parallel spaced vertically disposed cutting knives 43 are rigidly secured at their upper ends to this cross bar and the lower free ends of the cutting knives extend downwardly into the respective annular grooves 20 provided therefor in the upper face of the rotatable ring-like platform and this feature is clearly shown in Figure 10 of the drawings. The cutting edges of the vertical knives are remote from the discharge chute 31 and lateral extensions 44 are formed on the opposite longitudinal edges of the respective cutting knives adjacent the lower ends thereof. Vertically disposed guide fingers 45 extend upwardly from the outer ends of the lateral extensions as clearly shown in Figure 11 and the purpose of these guide fingers will be presently apparent. The cutting mechanism further includes the provision of a horizontally disposed cutting knife 46 that is arranged rearwardly of the cutting knives 43 and this horizontal cutting knife is supported by the suspension bars 47 arranged at the respective ends of the knife 46. The suspension bars extend upwardly and are pivotally connected at their upper ends to the intermediate portions of the levers 48, which levers are secured at their rear ends to suitable brackets 49, one of said brackets being attached to the inner wall 27 of the hopper while the other bracket is secured to the outer wall of the hopper as more clearly disclosed in Figure 1.

In this manner, the horizontally disposed cutting knife 46 will be adapted for vertical slidable movement adjacent the rear longitudinal edges of the vertical cutting knives 43 and the horizontal cutting knife 46 is formed with a plurality of openings 50 to accommodate the upwardly extending guide fingers 45. The means for effecting the raising and lowering of the horizontally disposed cutting knife 46 includes a potato engaging plate 51 that is arranged forwardly of the vertical cutting knives 43 and the upper edge of this vertical plate 51 is formed with the pairs of spaced apertured ears 52 for pivotal connection to the forward ends of the respective levers 48. A rearwardly inclined strip extends downwardly from the lower edge of the vertical portion 51 and is designated by the numeral 53 and the lower edge of this strip merges with the horizontally extending portion 54 of the potato engaging member and this rearwardly extending horizontal portion 54 is formed with the longitudinally extending slots 55 to accommodate the respective vertically disposed knives 43 and the guide fingers 45 arranged rearwardly of said vertical knives.

In Figure 9 of the drawings, the specific construction of the potato engaging unit is clearly illustrated. Normally the horizontally disposed cutting knife 46 rests on the laterally extending portions 44 as indicated by the full lines in Figure 11. The operation of my improved seed potato cutter may be briefly stated as follows. Potatoes are placed in the hopper 30 and during the rotation of the platform 13 on which the potatoes are carried, said cam track will cooperate with the vertical pressure members 34 to feed the potatoes one at a time to the cutting mechanism and in cutting small potatoes into small sections the potato engaging member will not be engaged by such small size potatoes and consequently the vertically movable horizontal knife 46 will rest on the lateral extensions 44 and the cutting edges of the vertical and horizontal bars will cut the potato forced through the cutting mechanism into small pieces or sections. The cutout portions 36 formed in the outer edges of each of the pressure members will terminate the vertical knives 43 and it will be of course understood that the upper edge of each pressure member that passes through the cutting mechanism will be disposed below the horizontal knife 46 so as not to interfere with the rotation of the platform.

The small sections that have been cut up will be discharged from the hopper through the discharge chute 31 into a suitable receptacle and as the upwardly disposed upper ends of the pressure members approach the side wall 33 of the discharge chute 31, the cam or track will cooperate with the hooks 38 to lower the pressure members so that the same will not strike the side wall 33. When potatoes of medium or large sizes are delivered to the cutting mechanism of the machine, said potatoes will engage the member 51 and the inclined portion 53 thereof to effect the raising of said member upwardly to the position shown in dotted lines and this will result in the levers 48 being raised to thrust the horizontal cutting bar 46 upwardly on the guide fingers 45 so that said horizontal cutout will cut through the approximate center of a large potato after the vertical cutters or knives have slit the potato vertically. The potato engaging unit and the vertically movable horizontal knife will return to their normal positions by gravity after a large size potato has passed through the cutting mechanism.

It will thus be seen from the foregoing description, that I have provided a seed potato cutter which will at all times be positive and efficient in its operation in cutting potatoes into small sections for planting purposes and due to its simplicity, the parts can be readily and easily assembled. A seed cutting machine of the above-mentioned character will save considerable time and labor and furthermore due to its simplicity can be constructed at a very low cost.

While I have shown the preferred embodiment of my invention, it is to be understood that various changes in the size, shape and arrangement of parts may be resorted to without departing from the spirit of the invention and the scope of the appended claims.

What I claim is:—

1. In a seed potato cutter, a stand, a rotatable potato receiving platform arranged on the stand, stationary spaced vertical cutting knives arranged above the platform, a vertically movable horizontal cutting knife disposed adjacent the stationary vertical cutting knives, means carried by the rotatable platform for feeding the potatoes one at a time to the cutting mechanism, and a potato engaging unit arranged forwardly of the cutting mechanism and being operatively connected with the horizontal cutting knife for actuating the same depending upon the size of the potato that is fed to the cutting mechanism.

2. In a seed potato cutter, a stand, a potato receiving platform rotatably mounted on the stand, a cutting mechanism arranged above the platform, a discharge chute extending across the platform on one side of the cutting mechanism, and vertically slidable pressure members extending through the platform for feeding the potatoes one at a time through the cutting mechanism, and means for effecting the lowering of the vertically slidable pressure members to permit the same to pass beneath the discharge chute.

3. In a seed potato cutter, a stand, a potato receiving platform rotatably mounted on the stand, a cutting mechanism arranged above the platform, a discharge chute extending across the platform on one side of the cutting mechanism, vertically slidable pressure members extending through the platform for feeding the potatoes one at a time through the cuttting mechanism, means for effecting the lowering of the vertically slidable pressure members to permit the same to pass beneath the discharge chute, said last mentioned means including a cam track arranged below the platform the lower portion of each pressure member being cooperatively associated with the cam track.

4. In a seed potato cutter, a stand, a rotatable platform arranged on the stand, a hopper for disposition above the platform, a discharge chute extending from the hopper, a cutting mechanism arranged within the hopper forwardly of the discharge chute, a cam track supported on the stand below the rotatable platform, said platform being formed with a plurality of radially disposed slots, a potato pressure member slidably vertically through each slot for feeding the potatoes to the cutting mechanism during the rotation of the platform, and cooperating means between the lower portion of each pressure member and said cam track whereby the upper edge of the pressure members will be moved to an inoperative position during the move of the pressure members beneath the discharge chute.

5. In a seed potato cutter, a stand, a cutting mechanism comprising a plurality of stationary spaced vertical cutting knives, a horizontal cutting knife arranged rearwardly of the vertical cutting knives, suspension arms extending upwardly from the ends of the horizontal cutting knife, a pair of levers pivoted intermediate their ends through the upper ends of said suspension bars, the rear ends of the levers being pivotally mounted on a support, and a potato engaging unit arranged forwardly of the cutting mechanism being operatively associated with the forward ends of the levers to raise or lower the horizontal cutting knife depending upon the size of the potato fed to said cutting mechanism.

6. In a seed potato cutter, a stand, a cutting mechanism comprising a plurality of stationary spaced vertical cutting knives, a horizontal cutting knife arranged rearwardly of the vertical cutting knives, suspension arms extending upwardly from the ends of the horizontal cutting knife, a pair of levers pivoted intermediate their ends through the upper ends of said suspension bars, the rear ends of the levers being pivotally mounted on a support, a potato engaging unit arranged forwardly of the cutting mechanism being operatively associated with the forward ends of the levers to raise or lower the horizontal cutting knife depending upon the size of the potato fed to said cutting mechanism, said potato engaging means comprising a vertical plate connected at its upper edge to the forward ends of the levers, and a down-inclined rearwardly extending strip formed on the lower edge of said plate.

7. In a seed potato cutter, a stand, a cutting mechanism comprising a plurality of stationary spaced vertical cutting knives, a horizontal cutting knife arranged rearwardly of the vertical cutting knives, suspension arms extending upwardly from the ends of the horizontal cutting knife, a pair of levers pivoted intermediate their ends through the upper ends of said suspension bars, the rear ends of the levers being pivotally mounted on a support, and a potato engaging unit arranged forwardly of the cutting mechanism being operatively associated with the forward ends of the levers to raise or lower the horizontal cutting knife depending upon the size of the potato fed to said cutting mechanism, and means for guiding the vertically movable horizontal cutting knife in a vertically sliding position.

8. In a seed potato cutter, a stand, a cutting mechanism comprising a plurality of stationary spaced vertical cutting knives, a horizontal cutting knife arranged rearwardly of the vertical cutting knives, suspension arms extending upwardly from the ends of the horizontal cutting knife, a pair of levers pivoted intermediate their ends through the upper ends of said suspension bars, the rear ends of the levers being pivotally mounted on a support, a potato engaging unit arranged forwardly of the cutting mechanism being operatively associated with the forward ends of the levers to raise or lower the horizontal cutting knife depending upon the size of the potato fed to said cutting mechanism, means for guiding the vertically movable horizontal cutting knife in a vertically sliding position, said last mentioned means comprising a vertically extending guide finger carried by the rear edge of one of the stationary vertical cutting knives being spaced with respect thereto, the horizontal cutting knife being formed with an opening through which said finger projects.

In testimony whereof I affix my signature.

THOMAS A. TRUE.